(12) United States Patent
Kim et al.

(10) Patent No.: US 9,097,943 B2
(45) Date of Patent: Aug. 4, 2015

(54) LIQUID CRYSTAL DISPLAY DEVICE COMPRISING A LIQUID CRYSTAL LAYER HAVING A TWISTED HELICAL STRUCTURE WHEN AN ELECTRIC FIELD IS NOT GENERATED

(75) Inventors: Wook-Sung Kim, Gyeonggi-do (KR); Su-Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 994 days.

(21) Appl. No.: 13/207,620

(22) Filed: Aug. 11, 2011

(65) Prior Publication Data
US 2012/0038860 A1    Feb. 16, 2012

(30) Foreign Application Priority Data
Aug. 12, 2010    (KR) .................. 10-2010-0077996

(51) Int. Cl.
| | | |
|---|---|---|
| G02F 1/1337 | (2006.01) | |
| C09K 19/02 | (2006.01) | |
| G02F 1/1343 | (2006.01) | |
| G02F 1/137 | (2006.01) | |

(52) U.S. Cl.
CPC ...... *G02F 1/134363* (2013.01); *G02F 1/13718* (2013.01); *G02F 2001/133738* (2013.01); *G02F 2001/133742* (2013.01); *G02F 2001/134318* (2013.01)

(58) Field of Classification Search
CPC .............. G02F 1/13718; G02F 2001/133742
USPC .................................. 349/128, 130, 132, 141
See application file for complete search history.

(56) References Cited

U.S. PATENT DOCUMENTS

| | | | | |
|---|---|---|---|---|
| 2002/0171795 | A1* | 11/2002 | Woo et al. ............ | 349/124 |
| 2010/0134728 | A1* | 6/2010 | Kim et al. ............ | 349/106 |
| 2012/0140133 | A1* | 6/2012 | Choi et al. ........... | 349/33 |

FOREIGN PATENT DOCUMENTS

CN    1544978 A    11/2004

OTHER PUBLICATIONS

Gwag et al., Electro-optical characteristics of a chiral hybrid in-plane switching liquid crystal mode for high brightness, Optics Society of America, Optics Express, vol. 16, No. 16, pp. 12220-12226, Aug. 4, 2008.
Lee et al., Fast electro-optic device controlled by dielectric response of planarly aligned cholesteric liquid crystals, American Institute of Physics, Journal of Applied Physics 106, 014503, pp. 105, Jul. 7, 2009.
De Vries, Rotatory Power and Other Optical Properties of Certain Liquid Crystals, Acta Crystallogr., 4, 219, pp. 219-226, 1951.

(Continued)

*Primary Examiner* — Paul Lee
(74) *Attorney, Agent, or Firm* — Morgan, Lewis & Bockius LLP (57) ABSTRACT

A liquid crystal display device includes first and second substrate facing each other, a pixel electrode and a common electrode on an inner surface of the first substrate and generating an electric field substantially parallel to the first substrate, a first alignment layer on the inner surface of the first substrate and homeotropically aligned, a first polarizer on an outer surface of the first substrate and having a first polarization axis, a second alignment layer on an inner surface of the second substrate and homogeneously aligned, a second polarizer on an outer surface of the second substrate and having a second polarization axis perpendicular to the first polarization axis, and a liquid crystal layer between the first and second alignment layers.

7 Claims, 11 Drawing Sheets

(56) References Cited

OTHER PUBLICATIONS

Broughton et al., Optimized flexoelectric response in a chiral liquid-crystal phase device, American Institute of Physics, Journal of Applied Physics 98, 034109, pp. 1-6, Aug. 11, 2005.

Kawachi et al., Hysteresis Behavior of Texture in the Field-Induced Nematic-Cholesteric Relaxation, Japanese Journal of Applied Physics, vol. 16, No. 9, pp. 1673-1678, Sep. 1977.

Castles et al., Flexoelectro-optic properties of chiral nematic liquid crystals in the uniform standing helix configuration, The American Physical Society, Physical Review E 80, 031709, pp. 1-9, Sep. 18, 2009.

Castles et al., Thermodynamically Stable Blue Phases, The American Physical Society, Physical Review Letters, 104, 157801, pp. 1-4, Apr. 13, 2010.

Chinese Office Action dated Nov. 20, 2013 for corresponding Patent Application No. 201110231243.2.

\* cited by examiner

LIQUID CRYSTAL DISPLAY DEVICE COMPRISING A LIQUID CRYSTAL LAYER HAVING A TWISTED HELICAL STRUCTURE WHEN AN ELECTRIC FIELD IS NOT GENERATED

The present application claims the benefit of Korean Patent Application No. 10-2010-0077996 filed in Korea on Aug. 12, 2010, which is hereby incorporated by reference.

BACKGROUND OF THE INVENTION

1. Field of the Invention

The present invention relates to a liquid crystal display (LCD) device, and more particularly, to an LCD device having an improved contrast ratio and driven by a low voltage.

2. Discussion of the Related Art

Recently, on entering an information society, display technologies for dealing with and displaying intensive information have rapidly developed. The LCD device has replaced a cathode ray tube (CRT) due to its low power consumption, thin profile, light weight and portability.

In general, the LCD device uses the optical anisotropy and polarization properties of liquid crystal molecules to produce an image. The liquid crystal molecules have long thin shapes that can be aligned along specific directions. The alignment direction of the liquid crystal molecules can be controlled by applying an electric field.

Accordingly, the alignment of the liquid crystal molecules changes in accordance with the direction of the applied electric field and the light is refracted along the alignment direction of the liquid crystal molecules due to the optical anisotropy, thereby displaying images.

Since the LCD device including a thin film transistor (TFT) as a switching element, referred to as an active matrix LCD (AM-LCD) device, has excellent characteristics of high resolution and displaying moving images, the AM-LCD device has been widely used. Particularly, an in-plane switching (IPS) mode LCD device using a horizontal electric field has been developed due to a wide viewing angle.

Figure 1:
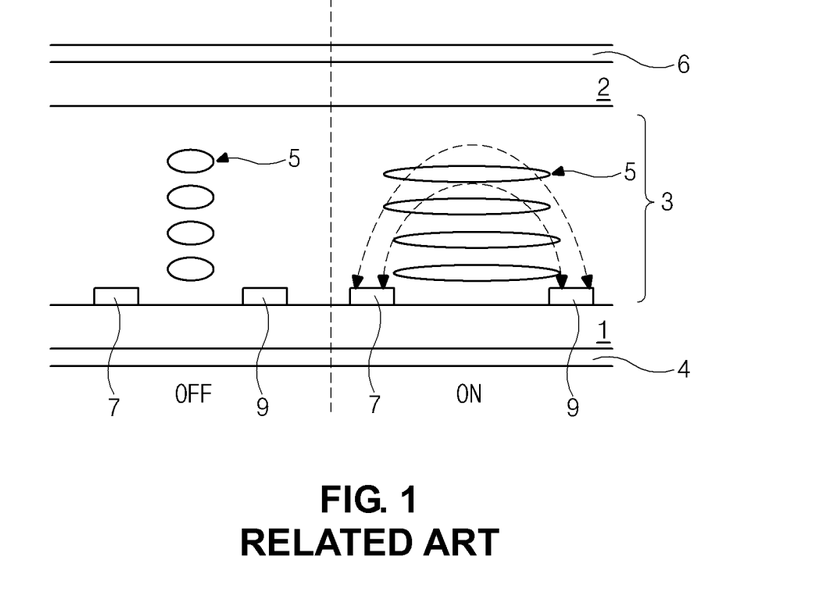
FIG. 1 is a cross-sectional view of the related art IPS mode LCD device.

FIG. 1 is a cross-sectional view of the related art IPS mode LCD device. As shown in FIG. 1, a first substrate 1 faces a second substrate 2, and a liquid crystal layer 3 is interposed between the first and second substrates 1 and 2. First and second polarizers 4 and 6 are disposed at outer surfaces of the first and second substrates 1 and 2, respectively. The first and second polarizers 4 and 6 have optical axes perpendicular to each other. The liquid crystal layer 3 includes liquid crystal molecules 5. In addition, a plurality of pixel electrodes 7 and a plurality of common electrodes 9 are disposed on the first substrate 1. The pixel electrodes 7 and the common electrodes 9 are spaced apart from each other and alternately arranged with each other. When voltages are applied to the pixel and common electrodes 7 and 9, a horizontal electric field is generated between the pixel and common electrodes 7 and 9.

With an off state, an electric field is not generated between the pixel and common electrodes 7 and 9. The liquid crystal molecules 5 maintain their initial arrangements, and the IPS mode LCD device produces a black color.

On the other hand, with an on state, a horizontal electric field is generated between the pixel and common electrodes 7 and 9. The liquid crystal molecules 5 are arranged along a direction of the horizontal electric field, and the IPS mode LCD device produces a white color.

The IPS mode LCD device driven by the horizontal electric field has an advantage in the viewing angle.

In the IPS mode LCD device of the related art, an achiral nematic liquid crystal layer is interposed between lower and upper substrates. First and second horizontal alignment layers are formed at inner surfaces of the lower and upper substrates, respectively, to thereby orient achiral nematic liquid crystal molecules of the achiral nematic liquid crystal layer. The first and second horizontal alignment layers have an alignment direction parallel to a polarization axis of a polarizer disposed at one of outer surfaces of the lower and upper substrates, for example, disposed at the outer surface of the lower substrate.

Transmittance in the IPS mode LCD device can be expressed by equation (1) as follows:

$$T = \sin^2(2\alpha)\sin^2\left(\frac{2\pi d \Delta n}{\lambda}\right), \quad \text{equation (1)}$$

where T is the transmittance, α is an angle between the director of the liquid crystal and the polarization axis of the polarizer, Δn is the refractive index, and d is a thickness of the liquid crystal layer.

From equation (1), in a black state (T=0), one of the conditions α=0, Δn=0 and d=0 should be satisfied. However, it is substantially impossible that Δn and d become zero. Accordingly, to obtain the black state, it is required to minimize a twisting of the director of the liquid crystal with respect to the polarization axis of the polarizer, that is, to meet the condition α=0.

By the way, the liquid crystal molecules, specially, nematic liquid crystal molecules are not completely aligned along the same direction due to thermal fluctuation, etc., and the nematic liquid crystal molecules are less unstable than a crystal in the degree of order. The degree of order is defined as an order parameter S expressed by equation (2). Nematic liquid crystal, generally, has an order parameter of about 0.3 to about 0.8. Here, S=1 means complete order, and S=0 means total disorder.

$$S = \int_{volume\,average}\left(\frac{3}{2}\cos^2\alpha - \frac{1}{2}\right)dv \quad \text{equation (2)}$$

Figure 2:
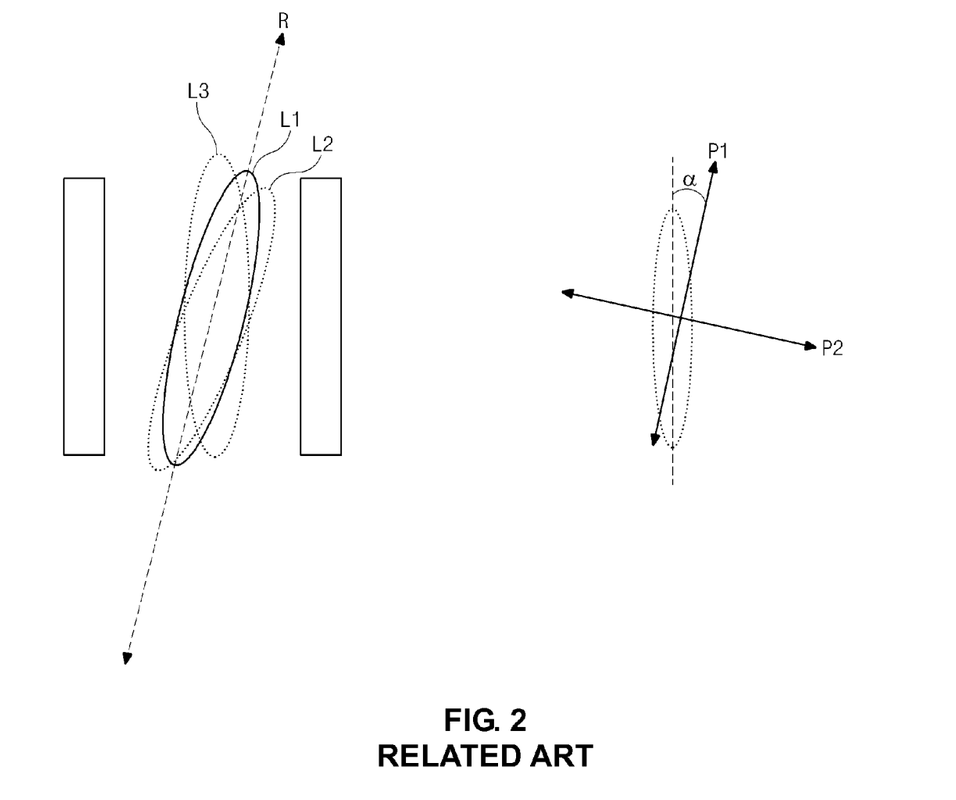
FIG. 2 is a schematic plan view of showing relation between the director of the liquid crystal and the polarization axis of the polarizer in the related art IPS mode LCD device.

Referring to FIG. 2, which is a schematic plan view of showing relation between the director of the liquid crystal and the polarization axis of the polarizer in the related art IPS mode LCD device, a liquid crystal molecule L1 is arranged along a rubbing direction R parallel to the polarization axis P1, and α is zero, α=0. On the other hand, other liquid crystal molecules L2 and L3 are arranged slant with respect to the polarization axis P1, and α is not zero, α≠0. Thus, in total, α is not zero. Here, P2 is another polarization axis perpendicular to the polarization axis P1.

Therefore, in the IPS mode LCD device of the related art, there may be light leakage due to the disordered alignment of the liquid crystal molecules deviating from the polarization axis of the polarizer when the black state is produced. This decreases the contrast ratio of the IPS mode LCD device.

SUMMARY OF THE INVENTION

Accordingly, the present invention is directed to an IPS mode LCD device that substantially obviates one or more of the problems due to limitations and disadvantages of the related art.

An object of the present invention is to provide an LCD device having advantages in a viewing angle and a contrast ratio.

Another object of the present invention is to provide an LCD device having an improved contrast ratio without increasing a driving voltage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes first and second substrate facing each other, a pixel electrode and a common electrode on an inner surface of the first substrate and generating an electric field substantially parallel to the first substrate, a first alignment layer on the inner surface of the first substrate and homeotropically aligned, a first polarizer on an outer surface of the first substrate and having a first polarization axis, a second alignment layer on an inner surface of the second substrate and homogeneously aligned, a second polarizer on an outer surface of the second substrate and having a second polarization axis perpendicular to the first polarization axis, and a liquid crystal layer between the first and second alignment layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiment, an example of which is illustrated in the accompanying drawings.

Figure 3:
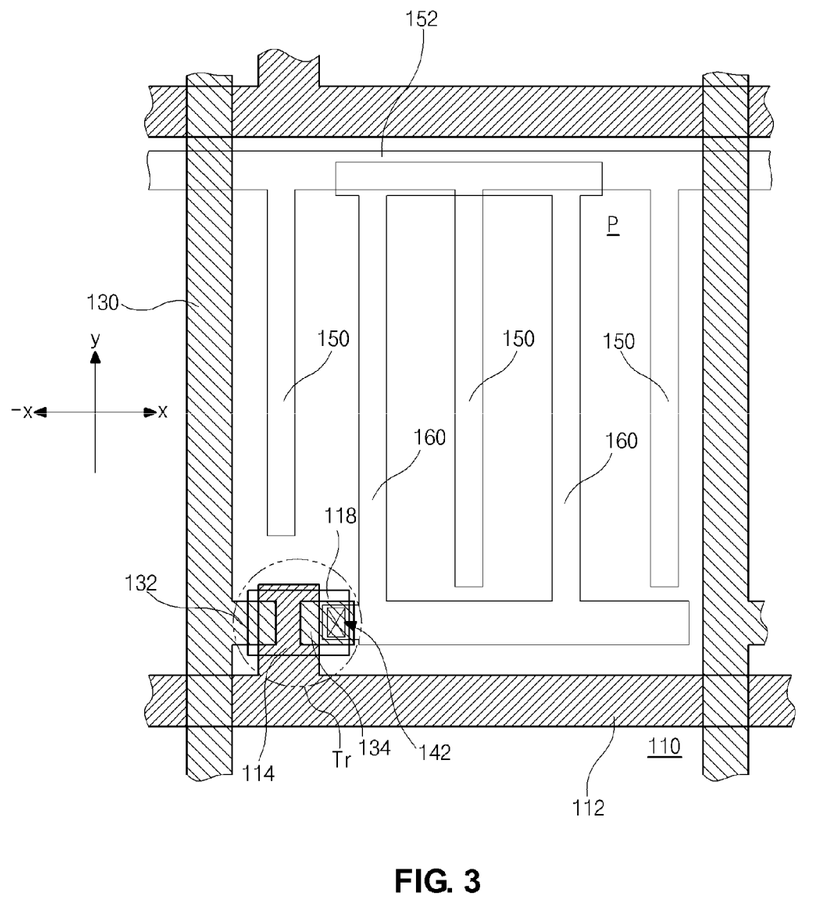
FIG. 3 is a schematic plan view of illustrating an array substrate for an LCD device according to the resent invention.
Figure 4:
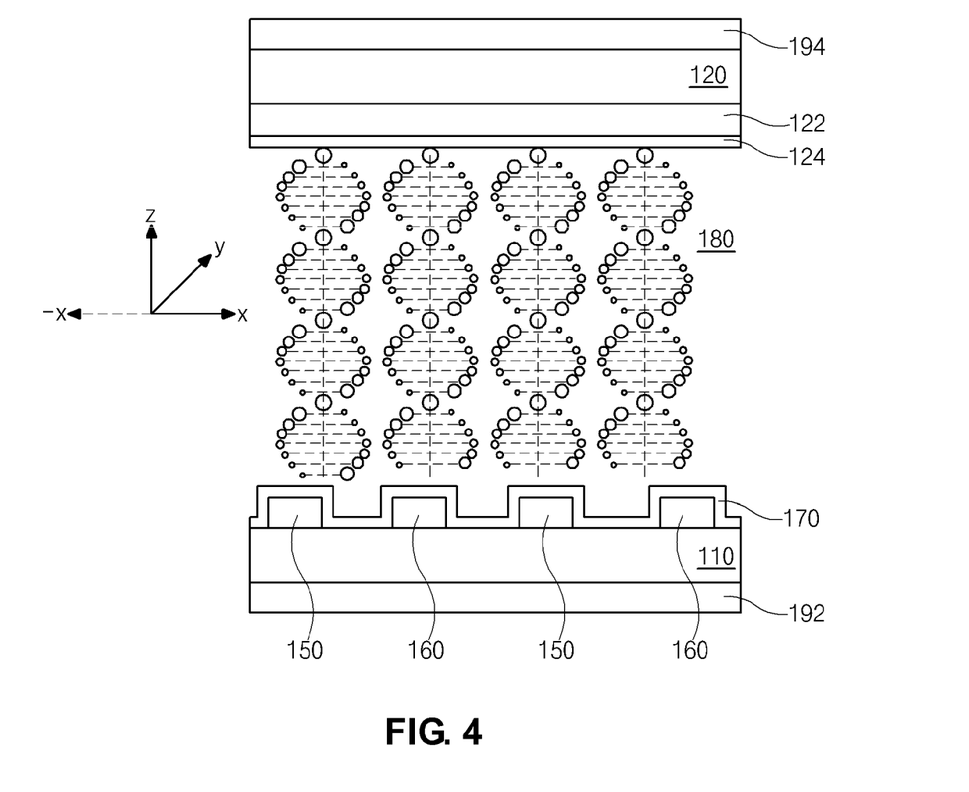
FIG. 4 is a schematic cross-sectional view of illustrating an LCD device according to the present invention.

FIG. 3 is a schematic plan view of illustrating an array substrate for an LCD device according to the resent invention, and FIG. 4 is a schematic cross-sectional view of illustrating an LCD device according to the present invention.

In FIG. 3 and FIG. 4, the LCD device according to the present invention includes a first substrate 110, a second substrate 120 facing the first substrate 110, and a liquid crystal layer 180 interposed between the first and second substrates 110 and 120. Although not shown in the figures, a backlight unit is disposed under the first substrate 110 to provide light toward a direction perpendicular to the first substrate 110, that is, the z-direction.

A common electrode 150 and a pixel electrode 160 are formed on the first substrate 110 to generate an electric field parallel to the first substrate 110. In addition, a gate line 112, a data line 130 and a switching element of a thin film transistor Tr are formed on the first substrate 110 to control generation and intensity of the electric field. A first alignment layer 170 is also formed on the first substrate 110 to determine the initial arrangement of liquid crystal molecules of the liquid crystal layer 180. The first alignment layer 170 is aligned along a direction parallel to the electric field.

The gate line 112 and the data line 130 cross each other to define a pixel region P. The thin film transistor Tr is connected to the gate line 112 and the data line 130. The thin film transistor Tr includes a gate electrode 114 connected to the gate line 112, a gate insulating layer (not shown) covering the gate electrode 114, a semiconductor layer 118 disposed over the gate insulating layer and overlapping the gate electrode 114, and source and drain electrodes 132 and 134 disposed over the semiconductor layer 118 and spaced apart from each other. The source electrode 132 is connected to the data line 130.

The common electrode 150 receives a voltage through a common line 152 parallel to the gate line 112 and includes patterns spaced apart from each other. The pixel electrode 160 is connected to the drain electrode 134 of the thin film transistor Tr and includes patterns spaced apart from each other. The patterns of the common electrode 150 alternate the patterns of the pixel electrode 160. A passivation layer (not shown) may cover the thin film transistor and have a drain contact hole 142 exposing the drain electrode 134. The pixel electrode 160 may be disposed on the passivation layer and connected to the drain electrode 134 of the thin film transistor Tr through the drain contact hole 142. The pixel electrode 160 receives a voltage through the thin film transistor Tr. The common electrode 150 and the pixel electrode 160 may be formed of the same material and on the same layer. In this case, the common line 152 may be formed on a different layer from the common electrode 150. Alternatively, the common electrode 150 and the pixel electrode 160 may be formed on different layers.

The common electrode 150 and the pixel electrode 160 may be extended along a direction parallel to the data line 130, that is, the y-direction. An electric field may be induced between the common electrode 150 and the pixel electrode 160 and may be parallel to the gate line 112, that is, x-direction or (-x)-direction. The liquid crystal molecules of the liquid crystal layer 180 are driven by the electric field.

A color filter layer 122 is formed on the inner surface of the second substrate 120 facing the first substrate 110. The color filter layer 122 includes red, green and blue color filter patterns, each of which corresponds to the pixel region P. A second alignment layer 124 is formed on the color filter layer 122. The second alignment layer 124 is aligned along the opposite direction to the alignment direction of the first alignment layer 170. Namely, the first and second alignment layers 170 and 124 are aligned parallel to the electric field induced between the common electrode 150 and the pixel electrode 160, wherein the second alignment layer 124 is aligned along the (-x)-direction when the first alignment layer 170 is aligned along the x-direction, and the second alignment layer 124 is aligned along the x-direction when the first alignment layer 170 is aligned along the (-x)-direction.

Although not shown in the figures, a black matrix may be formed on the second substrate 120 to shield the thin film transistor Tr, the gate line 112, and the data line 130 on the first substrate 120. That is, the black matrix is disposed to correspond to the thin film transistor Tr, the gate line 112 and the data line 130.

First and second polarizers 192 and 194 are disposed at outer surfaces of the first and second substrates 110 and 120, respectively. The first and second polarizers 192 and 194 have respective polarization axes perpendicular to each other. The polarization axes of the first and second polarizers 192 and 194 may be twisted at an angle of about 45 degrees with respect to the x-direction.

When no voltage is applied, i.e., in an off state, the liquid crystal molecules of the liquid crystal layer 180 have a helical twist structure in which chiral nematic liquid crystal molecules having a relatively short pitch are twisted dozens of times. The pitch of the helical twist structure is shorter than a wavelength of a visible ray. For example, the pitch of the helical twist structure may be within a range of 100 nm to 380 nm, and beneficially, the pitch may be less than about 300 nm. An axis of the helical twist structure of the liquid crystal molecules, i.e., a helical axis may be parallel to the z-direction, which is a direction for providing light from the backlight unit.

According to the papers of "H. DeVries, Acta Crystallogr. 4, 219 (1951)," "B. J. Broughton, M. J. Clarke, A. E. Blatch, and H. J. Coles, J. Appl. Phys. 98, 034109 (2005)" and "F. Castles, S. M. Morris and H. J. Coles, Physical Review E80, 031709 (2009)," the chiral liquid crystal molecules have an optical rotational effect expressed by equation (3).

$$\frac{\partial \Psi}{\partial z} = -\frac{2\pi}{P} \frac{\beta^2}{8\lambda'(1-\lambda'^2)}, \quad \text{equation (3)}$$

where $$\beta = \frac{(n_{//})^2 - (n_\perp)^2}{(n_{//})^2 + (n_\perp)^2}, \lambda' = \frac{\lambda}{p\sqrt{\frac{(n_{//})^2 + (n_\perp)^2}{2}}},$$

and p is the pitch of the helical twist structure.

Therefore, a refractive index of the liquid crystal layer 180 along the z-direction, nz, is smaller than those along the x- and y-directions, nx and ny, and the refractive indexes along the x- and y-directions are equal. That is, nz<nx=ny. Thus, the liquid crystal layer 180 has an optical isotropic property at a front viewing angle such that birefringence is not produced at the front viewing angle with the off state. When polarizers having cross optical axes are used, an excellent black color property is achieved. In other word, there is an advantage in a contrast ratio.

The liquid crystal molecules are driven by the electric field between the common electrode 150 and the pixel electrode 160. According to the paper of "Ho Hyun Lee, Jeong-Seon Yu, Jong-Hyun Kim, Shin-ichi Yamamoto, and Hirotsugu Kikuchi, JOURNAL OF APPLIED PHYSICS 106, 014503 (2009)," the transmitted intensity I in the LCD device is given by equation (4).

$$I \propto \frac{\pi^2 M^2 + \Gamma^2/4 \sin^2(2\varphi)\sin^2(\sqrt{\pi^2 M^2 + \Gamma^2/4})}{\pi^2 M^2}, \quad \text{equation (4)}$$

where p is the pitch of the helical twist structure of the liquid crystal molecules, $\Gamma=(2\pi d\Delta n/\lambda)$, $\phi$ is an angle between the director of the liquid crystal molecules and the polarization axis of the polarizer, and M=2(d/p).

When $\phi=\pi/4$ and $2\lambda/\Delta n \gg p$, the equation (3) is given by equation (5).

$$I \propto (\Gamma^2/8\pi M)^2 \quad \text{equation (5)}$$

Namely, the transmitted intensity I is determined by effective birefringence for obtaining effective retardation value and the number of twists of the helical twist structure, i.e., the pitch. Therefore, as the pitch becomes short, the black color property is improved.

According to the papers of "B. J. Broughton, M. J. Clarke, A. E. Blatch, and H. J. Coles, J. Appl. Phys. 98, 034109 (2005)" and "F. Castles, S. M. Morris and H. J. Coles, Physical Review E 80, 031709 (2009)," the LCD device, which includes the short-pitch chiral nematic liquid crystal molecules driven by an in-plane electric field, can have the increased transmittance by using the flexoelectric effect.

Figure 5:
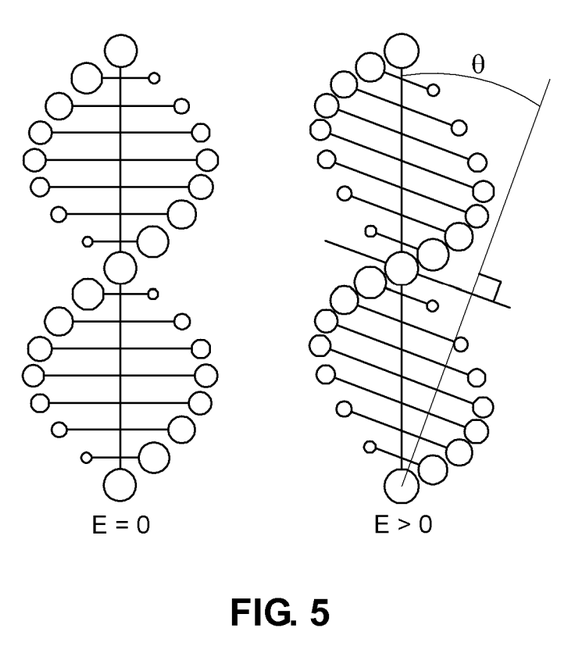
FIG. 5 is a schematic view of showing movements of the liquid crystal molecules using the flexoelectric effect.

Referring to FIG. 5, which shows movements of the liquid crystal molecules using the flexoelectric effect, when a voltage is not applied, that is, E=0, the liquid crystal molecules have a helical twist structure in which the short-pitch chiral nematic liquid crystal molecules are twisted dozens of times, and the axis of the helical twist structure, i.e., the helical axis is parallel to the optical axis. On the other hand, when a voltage is applied, that is, E>0, the helical axis is inclined at an angle θ, and the birefringence is produced, whereby the transmitted intensity is increased.

In the LCD device using the flexoelectric effect, the pitch of the helical twist structure is not changed, and M relating to the pitch of the helical twist structure in equation (4) does not contribute to the transmitted intensity. In result, the transmitted intensity of the LCD device using the flexoelectric effect is a function of $\Gamma=(2\pi d\Delta n/\lambda)$. As the helical axis gets more inclined, namely, as θ becomes larger, the transmitted intensity increases.

The inclined angle θ of the helical axis is expressed by the flexoelectric constant e and the elastic constant K as shown in equation (6).

$$\tan\theta = \frac{e_1 - e_3}{2K_{22}k}E - \frac{K_{11} - 2K_{22} + K_{33}}{2K_{22}}\sin\theta \quad \text{equation (6)}$$

Here, when the inclined angle θ of the helical axis is very small, equation (6) can be led to equation (7).

$$\tan\theta \approx \frac{e_1 - e_3}{(K_{11} + K_{33})k} E \qquad \text{equation (7)}$$

To obtain the maximum value of the inclined angle θ of the helical axis, a flexoelectric liquid crystal material having a relatively high polarity value is needed. However, a flexoelectric liquid crystal material generally has a relatively low polarity value, and thus the transmitted intensity is low. In this case, to increase the transmitted intensity, a driving voltage is considerably raised.

Meanwhile, a driving principle of an LCD device using an dielectric effect will be described with reference to FIG. 3, FIG. 6, FIG. 7A and FIG. 7B.

Figure 7A:
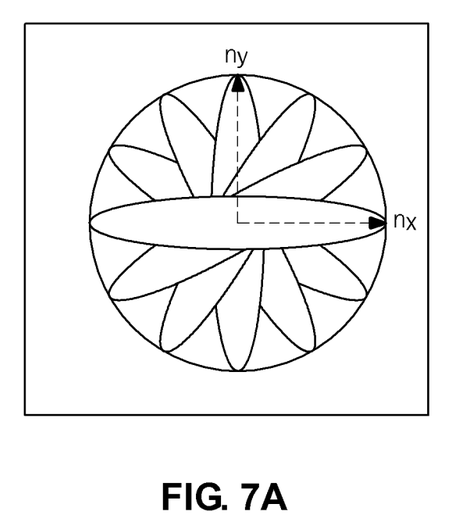
FIGS. 7A and 7B are schematic views of showing movements of the liquid crystal molecules using the dielectric effect.
Figure 7B:
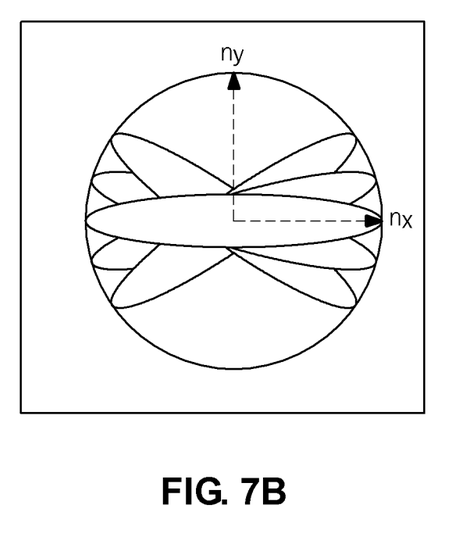

According to the paper of "Ho Hyun Lee, Jeong-Seon Yu, Jong-Hyun Kim, Shin-ichi Yamamoto, and Hirotsugu Kikuchi, JOURNAL OF APPLIED PHYSICS 106, 014503 (2009)," as shown in FIG. 3 and FIG. 7A, in an off state where a voltage is not applied, the liquid crystal molecules has a helical twist structure. Namely, the liquid crystal molecules are chiral nematic liquid crystal molecules having a relatively short pitch and are twisted dozens of times. The pitch of the helical twist structure is shorter than a wavelength of a visible ray. For example, the pitch may be within a range of about 100 nm to 380 nm, and beneficially, the pitch may be less than 300 nm. An axis of the helical twist structure of the liquid crystal molecules is parallel to light from the backlight unit (not shown). Namely, the helical axis is parallel to the z-direction.

In addition, a refractive index of the liquid crystal molecules along the z-direction is smaller than those along the x- and y-directions, and the refractive indexes along the x- and y-directions are equal. ($n_z < n_x = n_y$) Namely, the liquid crystal molecules have an optical isotropic property at a front viewing angle such that birefringence is not produced at the front viewing angle with an off state where no voltage is applied and an excellent black color property is achieved. In other word, there is an advantage in a contrast ratio.

Figure 6:
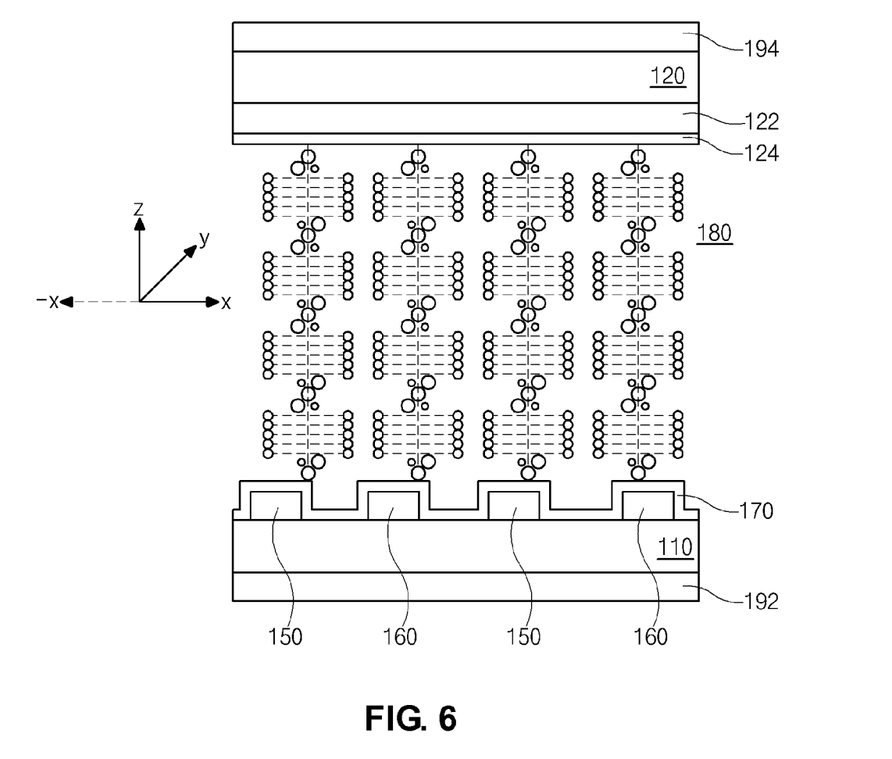
FIG. 6 is a schematic cross-sectional view of showing movements of the liquid crystal molecules using the dielectric effect.

Referring to FIG. 6 and FIG. 7, in an on state where a voltage is applied, the liquid crystal molecules are rotated along the electric field, i.e., the x-direction, with the helical axis of the z-direction. Namely, the liquid crystal molecules, which are twisted in a helical shape with the off state, are untwisted due to the electric field, and the pitch is increased. At this time, the liquid crystal molecules have a positive dielectric anisotropic property, and the liquid crystal molecules are arranged such that its long axis is parallel to the electric field.

In other word, if the in-plane electric field is uniformly applied to the chiral nematic liquid crystal molecules, the helical twist structure is untwisted, and the pitch is increased. When a critical driving voltage is applied with a unit cell gap, the helical twist structure is completely untwisted. Here, the director of the liquid crystal molecules has an angle of π/4 with respect to the polarization axis of the polarizer, and in equation (1), the maximum transmittance can be obtained by controlling the effective retardation value, dΔn=λ/4.

The helical axis of the liquid crystal molecules using the dielectric effect is not changed. Namely, in equation (5), the transmitted intensity depends on not Γ but M, which is a function of the pitch. Accordingly, there is a limit on increasing the transmitted intensity, and to achieve the relatively high transmittance, the driving voltage should be increased.

In the above-mentioned LCD device where the short-pitch chiral nematic liquid crystal molecules are arranged in the helical twist shape by the homogeneously-aligned alignment layers such that the long axes of the liquid crystal molecules are parallel to the substrates, the liquid crystal molecules are driven by using one of the flexoelectric effect or the dielectric effect. At this time, only one of two factors contributing to the transmitted intensity in equation (5) is used, and thus it is not possible to have advantages in both the transmittance and the driving voltage.

Figure 8:
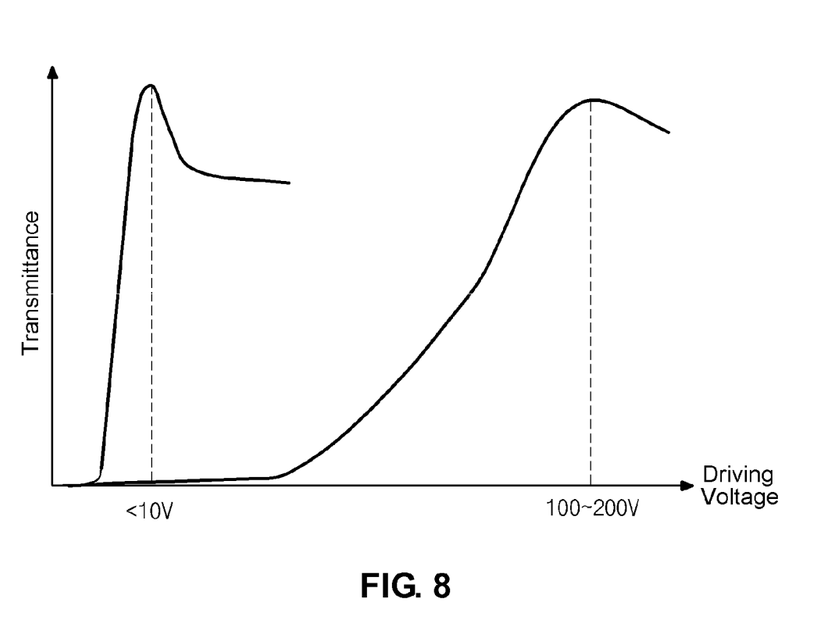
FIG. 8 is a graph of showing the relation between the transmittances and the driving voltages of the related art IPS mode LCD device and the LCD device using the flexoelectric effect.

This can be noticed from FIG. 8, which shows the relation between the transmittances and the driving voltages of the related art IPS mode LCD device and the LCD device using the flexoelectric effect. As shown in FIG. 8, to obtain the same transmittance, the LCD device using the flexoelectric effect requires the higher driving voltage, for example, 100 V to 200 V, than the related art IPS mode LCD device.

To solve the problem of the high driving voltage, an LCD device according to an exemplary embodiment of the invention will be described with reference to FIGS. 9A to 9C.

Figure 9A:
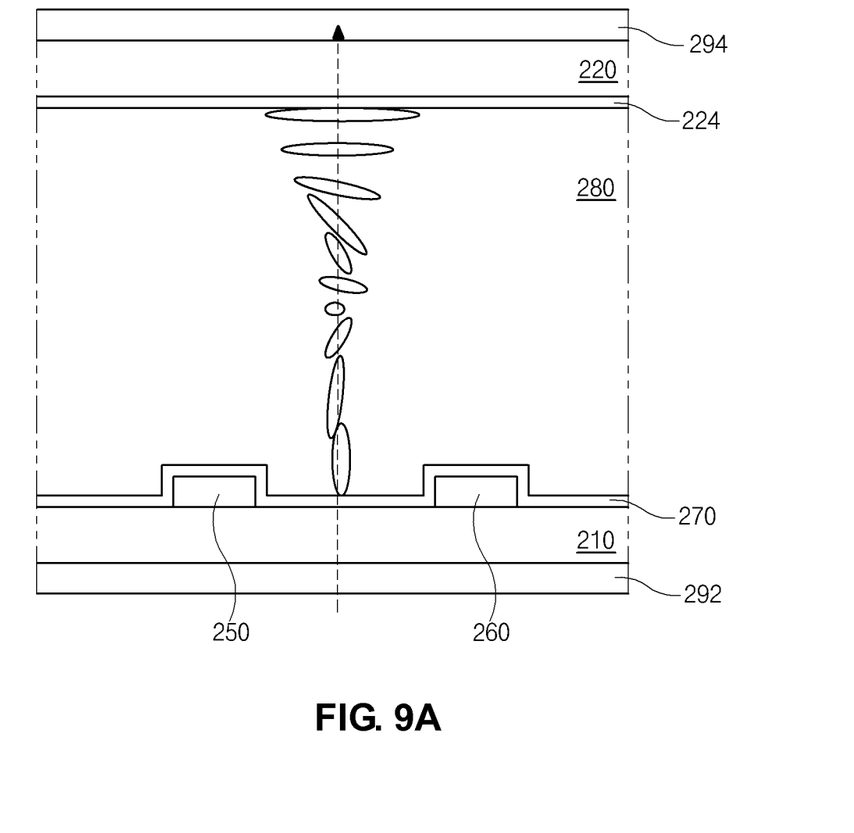
FIGS. 9A to 9C are schematic cross-sectional views of illustrating operation of an LCD device according to an exemplary embodiment of the invention.

In FIG. 9A, with an off state where a voltage is not applied, the LCD device according to the invention includes a first substrate 210, a second substrate 220 facing the first substrate 210, and a liquid crystal layer 280 interposed between the first and second substrates 210 and 220. Although not shown in the figures, a backlight unit is disposed under the first substrate 210 and provides light toward a direction perpendicular to the first substrate 210, namely, the z-direction.

A common electrode 250 and a pixel electrode 260 are formed on the first substrate 210 and produce an in-plane electric field parallel to the first substrate 250. In addition, although not shown in the figures, a gate line, a data line and a switching element of a thin film transistor are formed on the first substrate 210 to control generation and intensity of the electric field between the common electrode 250 and the pixel electrode 260. A first alignment layer 270 is also formed on the first substrate 210 to determine the initial arrangement of liquid crystal molecules of the liquid crystal layer 280.

The common electrode 250 and the pixel electrode 260 may be extended along direction parallel to the data line, that is, the y-direction. An electric field may be generated between the common electrode 250 and the pixel electrode 260 and may be parallel to the first substrate 210 along a direction parallel to the gate line, that is, x-direction or (−x)-direction. The liquid crystal molecules of the liquid crystal layer 280 may be driven by the electric field.

The liquid crystal molecules of the liquid crystal layer 280 have a helical twist structure in which the liquid crystal molecules are twisted dozens of times along a helical axis perpendicular to the first substrate 210. Here, light from the backlight unit is parallel to the helical axis. That is, the liquid crystal molecules of the liquid crystal layer 280 are driven by the electric field, which is perpendicular to the helical axis.

A color filter layer (not shown) is formed on the inner surface of the second substrate 220 facing the first substrate 210. The color filter layer includes red, green and blue color filter patterns, each of which corresponds to a pixel region. A second alignment layer 224 is formed on the color filter layer. Although not shown in the figures, a black matrix may be formed on the second substrate 220 to shield the thin film transistor, the gate line, and the data line on the first substrate 220. That is, the black matrix is disposed to correspond to the thin film transistor, the gate line and the data line.

Additionally, first and second polarizers 292 and 294 are disposed at outer surfaces of the first and second substrates 210 and 220, respectively. The first and second polarizers 292 and 294 have respective polarization axes perpendicular to each other. The polarization axes of the first and second polarizers 292 and 294 may be twisted at an angle of about 45 degrees with respect to the x-direction.

As stated above, referring to FIG. 7A, in an off state where a voltage is not applied, the liquid crystal molecules of the liquid crystal layer 280 have a helical twist structure in which short-pitch chiral nematic liquid crystal molecules are twisted dozens of times, and the liquid crystal molecules have an optical isotropic property. Here, since the polarization axes of the first and second polarizers 292 and 294 are perpendicular to each other, a black color is produced. Thus, the LCD device is a normally black mode.

In the exemplary embodiment of the invention, the first alignment layer 270 is homeotropically aligned, and the second alignment layer 224 is homogeneously aligned. Namely, the first and second alignment layers 270 and 224 form a hybrid-type arrangement structure.

As mentioned above, the liquid crystal layer 280 includes short-pitch chiral nematic liquid crystal molecules twisted in a helical twist structure, and if the liquid crystal molecules are arranged by the homogeneously-aligned alignment layers, very high driving voltage is required in order to obtain the high transmittance.

More particularly, the chiral nematic liquid crystal molecules are arranged parallel to the first substrate 210 by the first and second alignment layers 270 and 224 homogeneously aligned. Then, the liquid crystal molecules are driven by the in-plane electric field between the common electrode 250 and the pixel electrode 260. At this time, the electric field is substantially perpendicular to the first substrate 210 over the common electrode 250 and the pixel electrode 260. Since the liquid crystal molecules are arranged along the electric field, the very high driving voltage is needed to drive the liquid crystal molecules over the common electrode 250 and the pixel electrode 260.

To solve the high driving voltage, in the exemplary embodiment of the invention, the first alignment layer 270 on the first substrate 210 is homeotropically aligned such that the liquid crystal molecules are arranged perpendicular to the first substrate 210. Therefore, the driving voltage is prevented from being raised.

Figure 9B:
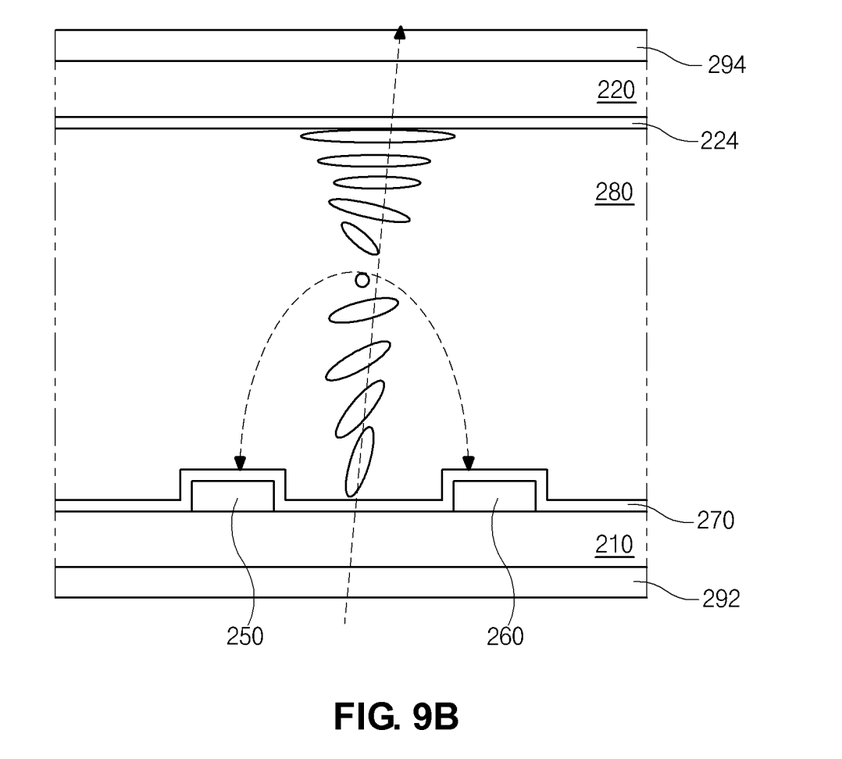
Figure 9C:
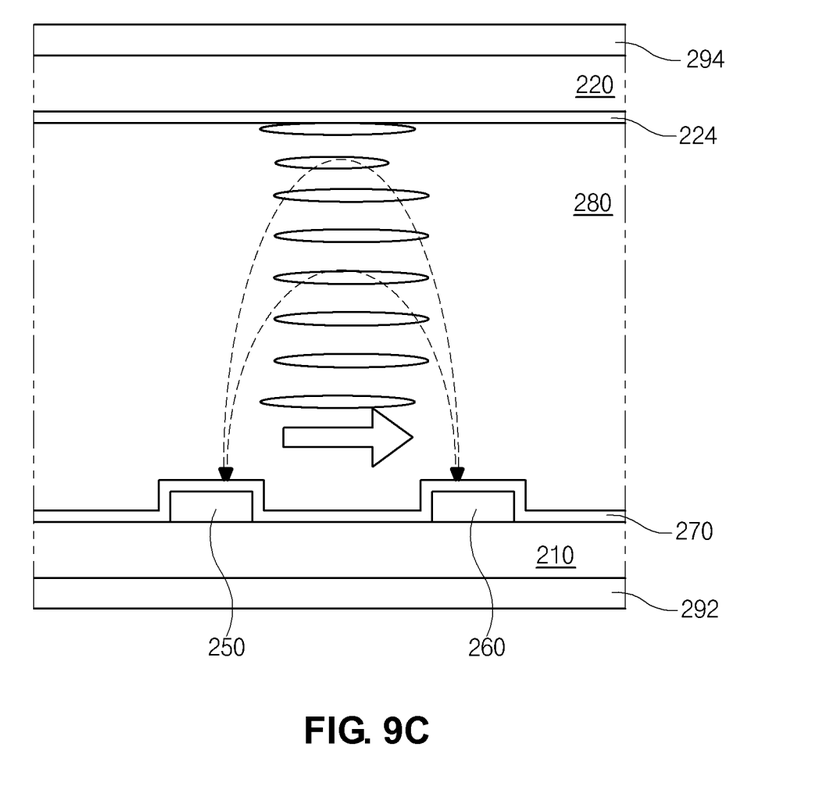

Referring to FIG. 9B and FIG. 9C, which show the liquid crystal molecules driven by an electric field having a first intensity and an electric field having a second intensity, respectively. Here, the second intensity is larger than the first intensity. The liquid crystal molecules are rotated by the in-plane electric field between the common electrode 250 and the pixel electrode 26, and the helical axis is tilted. The higher the intensity of the electric field is, the more the rotation of the liquid crystal molecules and the tilt of the helical axis are.

Namely, in the invention, the short-pitch chiral nematic liquid crystal molecules are twisted in a helical twist shape, and the liquid crystal molecules are driven using the phase retardation effect due to the liquid crystal molecules, which are tilted by the electric field perpendicular to the helical axis, similarly to the flexoelectric effect and the increase of the transmittance due to the untwist of the helical structure by the dielectric effect. Thus, there are advantages in the viewing angle and the contrast ratio. Here, the liquid crystal molecules have a positive dielectric anisotropic property, and the long axes of the liquid crystal molecules are arranged along the electric field.

At this time, the first alignment layer 270 under the liquid crystal layer 280 is homeotropically aligned, and the second alignment layer 224 over the liquid crystal layer 280 is homogeneously aligned. Accordingly, there is an advantage in preventing the driving voltage from being increased. In other word, the driving voltage for the maximum transmittance can be reduced. Therefore, high quality images having short response time and high contrast ratio can be produced in the IPS mode LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other;
   a pixel electrode and a common electrode on an inner surface of the first substrate and generating an electric field substantially parallel to the first substrate;
   a first alignment layer on the inner surface of the first substrate and homeotropically aligned;
   a first polarizer on an outer surface of the first substrate and having a first polarization axis;
   a second alignment layer on an inner surface of the second substrate and homogeneously aligned;
   a second polarizer on an outer surface of the second substrate and having a second polarization axis perpendicular to the first polarization axis; and
   a liquid crystal layer between the first and second alignment layers,
   wherein liquid crystal molecules of the liquid crystal layer are twisted in a helical structure having a helical axis perpendicular to the first substrate when an electric field is not generated, and the liquid crystal molecules are untwisted such that the helical axis is tilted with respect to the first substrate and arranged along a first direction when the electric field is generated.

2. The device according to claim 1, wherein a pitch of the helical structure is less than 300 nm.

3. The device according to claim 1, wherein liquid crystal molecules of the liquid crystal layer have a positive dielectric anisotropic property.

4. The device according to claim 1, wherein the first polarization axis has an angle of 45 degrees with respect to the first direction.

5. The device according to claim 1, further comprising:
   a gate line on the first substrate and extending along the first direction;
   a data line on the first substrate and extending along a second direction to cross the gate line; and
   a switching element connected to the gate and data lines, wherein the pixel electrode is connected to the switching element.

6. The device according to claim 5, wherein the pixel and common electrodes extend along the second direction and are alternately arranged with each other.

7. The device according to claim 5, further comprising:
   a black matrix on the second substrate and shielding the switching element, the gate line and the data line; and
   a color filter layer on the second substrate and including red, green and blue color filter patterns.

* * * * *